US012663262B2

(12) United States Patent
Mitani

(10) Patent No.: US 12,663,262 B2
(45) Date of Patent: Jun. 23, 2026

(54) THREE-DIMENSIONAL MEASUREMENT APPARATUS

(71) Applicant: DENSO WAVE INCORPORATED, Chita-gun (JP)

(72) Inventor: Yusuke Mitani, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 110 days.

(21) Appl. No.: 18/883,777

(22) Filed: Sep. 12, 2024

(65) Prior Publication Data
US 2025/0003738 A1 Jan. 2, 2025

Related U.S. Application Data

(63) Continuation of application No. PCT/JP2023/001153, filed on Jan. 17, 2023.

(30) Foreign Application Priority Data

Mar. 14, 2022 (JP) ................................. 2022-038861

(51) Int. Cl.
*G01B 11/25* (2006.01)
(52) U.S. Cl.
CPC .................................... *G01B 11/25* (2013.01)
(58) Field of Classification Search
CPC .. G01B 11/25; G01B 11/2513; G01B 11/2527
See application file for complete search history.

(56) References Cited

U.S. PATENT DOCUMENTS

| | | | |
|---|---|---|---|
| 10,161,789 B2 * | 12/2018 | Suh ...................... | H04N 25/707 |
| 10,855,927 B2 * | 12/2020 | Jung .................... | H04N 25/707 |
| 2016/0227135 A1 | 8/2016 | Matolin et al. | |

FOREIGN PATENT DOCUMENTS

| | | |
|---|---|---|
| JP | 3723057 B2 | 12/2005 |
| JP | 2020-020640 A | 2/2020 |

* cited by examiner

*Primary Examiner* — Seung C Sohn
(74) *Attorney, Agent, or Firm* — Oliff PLC

(57) ABSTRACT

A three-dimensional measurement apparatus includes: a projection device projecting a predetermined stripe pattern on a measurement object; an imaging device capturing an image of the measurement object on which the predetermined stripe pattern is projected; a measurement device measuring a three-dimensional shape of the measurement object using a phase shift method by determining stripe pattern information from the image captured by the imaging device; and a controller controlling the projection device. The measurement device determines, in the image captured by the imaging device, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

6 Claims, 7 Drawing Sheets

128ms     128ms     128ms     128ms $F1(x,y)$ $\leftarrow$ +128ms $\rightarrow$ + 0ms

THREE-DIMENSIONAL MEASUREMENT APPARATUS

CROSS REFERENCE TO RELATED APPLICATIONS

The present application is a continuation application of International Patent Application No. PCT/JP2023/001153 filed on Jan. 17, 2023, which designated the U.S. and claims the benefit of priority from Japanese Patent Application No. 2022-038861 filed on Mar. 14, 2022. The entire disclosures of all of the above applications are incorporated herein by reference.

TECHNICAL FIELD

The present disclosure relates to a three-dimensional measurement apparatus that measures a three-dimensional shape of a measurement object.

BACKGROUND

Conventionally, as a three-dimensional measurement apparatus for measuring a three-dimensional shape of a measurement object, an apparatus using a phase shift method is known.

SUMMARY

The present disclosure provides a three-dimensional measurement apparatus that includes: a projection device projecting a predetermined stripe pattern on a measurement object; an imaging device capturing an image of the measurement object on which the predetermined stripe pattern is projected; a measurement device measuring a three-dimensional shape of the measurement object using a phase shift method by determining stripe pattern information from the image captured by the imaging device; and a controller controlling the projection device. The measurement device determines, in the image captured by the imaging device, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

BRIEF DESCRIPTION OF DRAWINGS

Objects, features and advantages of the present disclosure will become apparent from the following detailed description made with reference to the accompanying drawings. In the drawings:

FIG. 7 shows, in (A), an explanatory diagram illustrating an output state of event data for each of the R, G, and B color light emitting states in a case where polarity control is not performed in the first embodiment, and shows, in (B), an explanatory diagram illustrating an output state of event data for each of the R, G, and B color light emitting states in a case where control of end point polarity is performed in the first embodiment.

DETAILED DESCRIPTION

Figure 1:
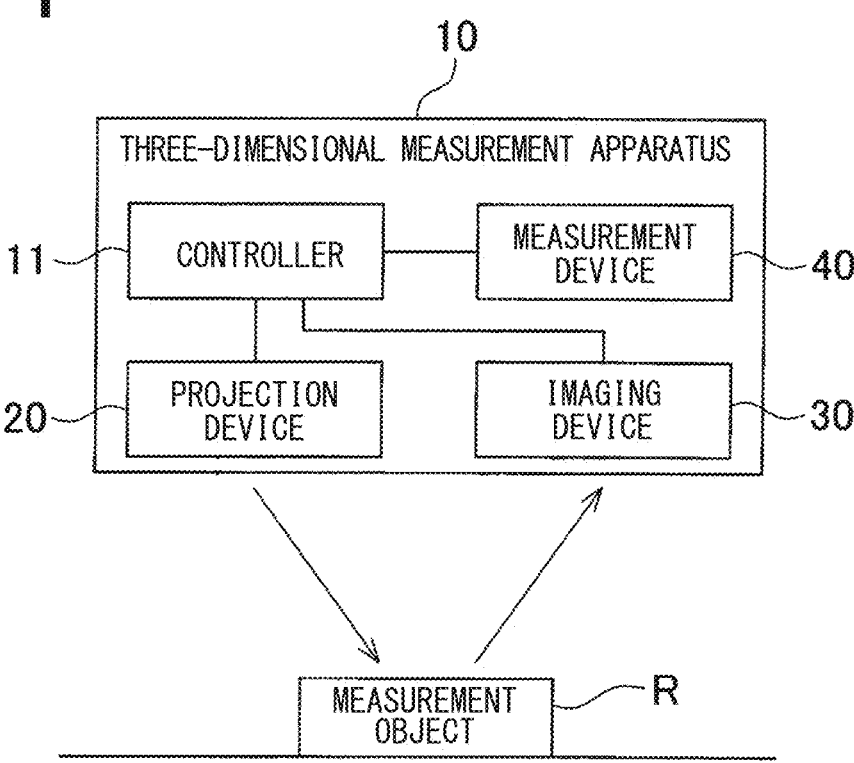
FIG. 1 is a block diagram showing a schematic configuration of a three-dimensional measurement apparatus according to a first embodiment.

As a three-dimensional measurement apparatus for measuring a three-dimensional shape of a measurement object, an apparatus using a phase shift method is known. The phase shift method is a technique for projecting multiple stripe pattern images with shifted phases, and performing three-dimensional measurement of the measurement object onto which the stripe pattern images are projected. As a technique for performing three-dimensional measurement using the phase shift method, a three-dimensional measurement apparatus assigns each phase of stripe to light having a different wavelength from one another, projects the composited stripe pattern image toward the measurement object, and then uses a color camera to photograph the measurement object toward which the stripe pattern image is projected. Then, each color component is extracted from the captured image and the phase is calculated in one capture, thereby shortening the time required to measure the three-dimensional shape.

An event camera is known as a camera for generating an image of measurement object at a high speed. This event camera is developed based on a retinal structure of living organisms, and outputs luminance value differential. This event camera detects a change in luminance for each pixel and output coordinates, time, and a polarity of luminance change. With this configuration, the event camera is characterized in that it does not output pixel information having no change in luminance, that is, redundant data (event data) compared with a conventional camera that outputs pixel information having no change. Thus, the event camera can reduce the amount of data communication and reduce an image processing load, thereby enabling generate images of the measurement object at a higher speed.

However, in an image of the measurement object generated using event data output from the event camera, although it is possible to determine whether there is a change in luminance on a pixel-by-pixel basis from the image, it is impossible to directly measure the luminance value. For this reason, it is difficult to use the three-dimensional measurement method, such as a phase shift method to measure a three-dimensional shape of the measurement object since phase shift method utilizes luminance values to measure the three-dimensional shape.

According to an aspect of the present disclosure, a three-dimensional measurement apparatus includes: a projection device projecting a predetermined stripe pattern on a measurement object; an imaging device capturing an image of the measurement object on which the predetermined stripe pattern is projected; a measurement device measuring a three-dimensional shape of the measurement object using a phase shift method by determining stripe pattern information from the image captured by the imaging device; and a controller controlling the projection device.

The projection device projects the predetermined stripe pattern by controlling, using the controller, ON or OFF of reflection of incident light by a digital micromirror device (DMD), which has multiple mirrors arranged in an array, for each of the multiple mirrors. The controller sets an ON time or an OFF time of the reflection of incident light within a unit time period for each of the multiple mirrors in accordance with the predetermined stripe pattern. The imaging device includes an imaging element, the imaging element outputs event data including two-dimensional point data. The two-dimensional point data identifies a position of a pixel that has luminance change upon receiving of light. The imaging device generates the image of the measurement object based on the event data output from the imaging element. The imaging device: outputs positive event data when a luminance of the pixel becomes bright; outputs negative event data when the luminance of the pixel becomes dark; and suspends output of next event data until elapse of a predetermined time period, which is set to be shorter than the unit time period, after output of the event data. The measurement device determines, in the image captured by the imaging device, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

In the above configuration, the projection device projects a predetermined stripe pattern toward the measurement object by controlling, using a controller, ON or OFF of reflection of incident light on a DMD, which has multiple mirrors arranged in an array. The ON or OFF of reflection of incident light on each mirror is controlled by the controller. The controller sets the ON/OFF timing of the reflection within a unit time period for each mirror in accordance with a predetermined stripe pattern. The imaging device includes an imaging element that outputs event data including two-dimensional point data that identifies the position of a pixel that has experienced a change in luminance when light is received, and the imaging element is configured to output positive polarity event data when the luminance change is brighter and to output negative polarity event data when the luminance change is darker, and not to output next event data until a predetermined time period shorter than the unit time period time has elapsed since the event data was output. When the measurement device measures the three-dimensional shape of the measurement object by the phase shift method using stripe pattern information obtained from the image captured by the imaging device, it obtains the stripe pattern information on a pixel-by-pixel basis in the captured image based on (i) the time difference between output time of the previous event data and output time of the subsequent event data, which are output from the imaging element during the unit time period, and (ii) at least one of the polarity of previous event data and the polarity of subsequent event data.

In the above configuration, at least one of the polarity of previous event data or the polarity of subsequent event data is controlled. Compared with a case where the polarity is not controlled, the amount of information obtained when the event data is output can be increased. Since the amount of information obtained during per unit time period increases, the unit time period can be shortened even when expressing the same amount of information. Thus, the event data can be used to measure the three-dimensional shape of measurement object, and the event data can also be used to speed up three-dimensional measurement of measurement object.

According to another aspect of the present disclosure, the measurement device calculates the above-described stripe pattern information on a pixel-by-pixel basis in the captured image based on (i) the time difference between the output time of the previous event data and the output time of subsequent event data, which are output from the imaging element within a unit time period, and (ii) the polarities of the previous event data and the subsequent event data.

This configuration can further increase the amount of information obtained when the event data is output, thereby enabling further increase of the three-dimensional measurement speed of measurement object using the event data.

First Embodiment

The following will describe a first embodiment of a three-dimensional measurement apparatus according to the present disclosure with reference to the drawings.

Figure 2:
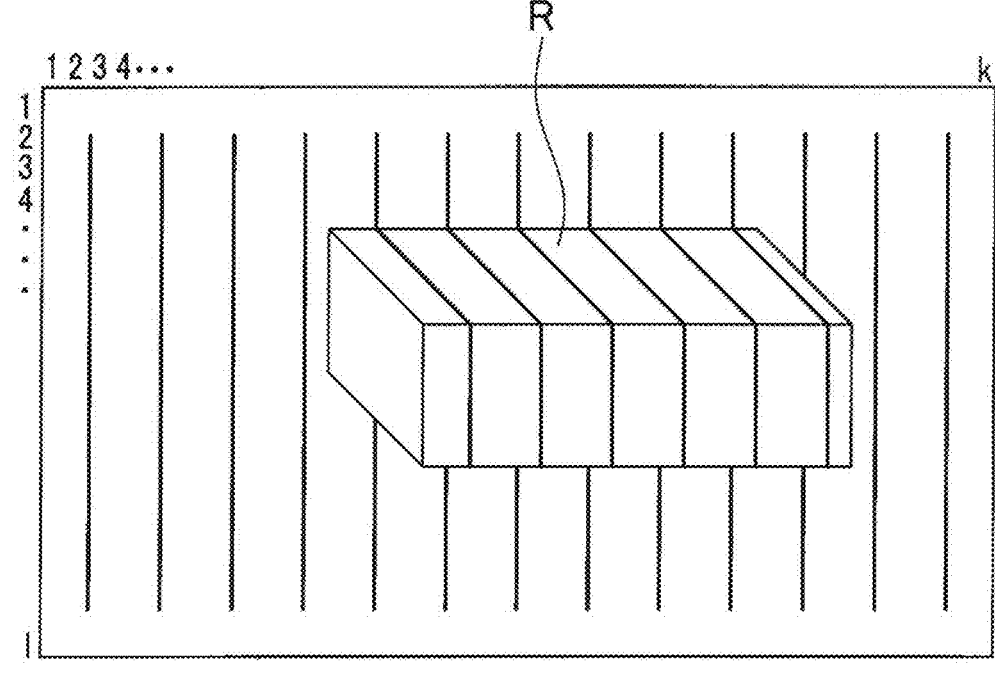
FIG. 2 is an explanatory diagram illustrating a state in which a stripe pattern for a general phase shift method is projected on a measurement object.

The three-dimensional measurement apparatus 10 according to the present embodiment is a device that measures a three-dimensional shape of a measurement object R. As shown in FIG. 1 and FIG. 2, the three-dimensional measurement apparatus 10 includes a controller 11 performing an overall control, a projection device 20 projecting a predetermined stripe pattern on the measurement object R for performing a phase shift method, an imaging device 30 capturing an image of the measurement object R on which the predetermined stripe pattern is projected, and a measurement device 40 measuring the three-dimensional shape of measurement object R using the captured image. The three-dimensional measurement apparatus 10 may be attached to, for example, a robot hand and measure the three-dimensional shape of measurement object R. The measurement object R may be a workpiece that moves relatively at high speed relative to the robot hand. The relative movement refers to a relative movement between a movement of the three-dimensional measurement apparatus 10 attached to the robot hand and a high-speed movement of the measurement object R. When a position of the three-dimensional measurement apparatus 10 is fixed, the relative movement refers to the movement of measurement object R.

For convenience, FIG. 2 shows a simplified version of a predetermined stripe pattern having up to 13 stripes. More specifically, since a typical stripe pattern is represented by a sine wave pattern, the light and dark portions of the stripe pattern have the same width. For convenience, in FIG. 2, the dark portions are represented by lines with a smaller width than widths of light portions. The number of stripes may be 13 or more in the embodiment. For convenience, in FIG. 2, the number of stripes is abbreviated to 13.

The controller 11 is mainly provided by a microcomputer, and includes a CPU, a system bus, an input/output interface, or the like. The controller 11 constitutes an information processing device together with a storage medium, such as a ROM, a RAM, a non-volatile memory, or the like. In addition to programs related to robot control, the storage medium stores, in advance, program related to control of the projection device 20 and program for executing control processing using three-dimensional measurement results generated by the measurement device 40. The control program stored in the storage medium can be executed by the controller 11.

The projection device 20 is a well-known Digital Light Processing (DLP) projector, and is controlled by the controller 11 to project a predetermined stripe pattern, which is to be described later, by reflecting light emitted from a light source using a Digital Micromirror Device (DMD) element. The DMD element includes an array of micro mirrors, each of which corresponds to one pixel of the image projected on a screen. The DMD element is configured to change the angle of each mirror to turn on or turn off the light to be emitted toward the screen in microsecond unit. The projection device 20 projects the predetermined stripe pattern by controlling, using the controller 11, the ON/OFF of reflection of incident light on the DMD for each mirror. The DMD includes multiple mirrors arranged in an array. Therefore, by changing a gradation of reflected light depending on a ratio of the time period during which each mirror is in on state to the time period during which each mirror is in off state, it becomes possible to display gradations based on the image data of the image to be projected.

In such a configuration, with an increase of the emission duration of single pulse emission that is emitted once within the unit time period secured for each emission state, the brightness of emission state is increased. Thus, the emission state can be specified according to the emission duration. Assume that the upper left pixel in FIG. 2 is (1, 1) and the lower right pixel is (k, l), the projection device 20 has mirrors corresponding to k×l pixels (for example, 1140× 912). For example, when R (red), G (green), and B (blue) colors are prepared as light incident on the DMD element, an R color light emitting state in which R color light is emitted by reflection on a mirror, a G color light emitting state in which G color light is emitted by reflection on a mirror, and a B color light emitting state in which B color light is emitted by reflection on a mirror are repeated at a predetermined short period of time. Each light emission duration can be adjusted individually, thereby enabling projection of a color image. For this reason, the controller 11 sets the ON/OFF time points of reflection within a unit time period for each mirror in accordance with the above-described predetermined stripe pattern.

The imaging device 30 is a well-known event camera, and is equipped with an imaging element that outputs event data (specifically, two-dimensional point data, time, and polarity of luminance change) including two-dimensional point data in which a position of pixel is identified corresponding to a pixel that has luminance change when light is received. The imaging device 30 is able to generate an image from the event data output from the imaging element. With respect to each pixel included in the captured image, when the luminance change occurs such that the pixel becomes brighter in response to receiving of the light, the imaging device 30 outputs event data having a positive polarity (positive luminance change). With respect to each pixel included in the captured image, when the luminance change occurs such that the light becomes darker and then disappears in response to receiving of the light, the imaging device 30 outputs event data having a negative polarity (negative luminance change). Image data of measurement object can be generated by plotting the two-dimensional point data of multiple event data output within a certain period of time as points on a specified plane. The imaging device 30 is configured to output the generated image data or event data (two-dimensional point data, time, polarity of luminance change) to the measurement device 40.

The measurement device 40 is controlled by the controller 11 and measures the three-dimensional shape of measurement object R using the phase shift method based on the image of measurement object R, which is captured by the imaging device 30. The image of measurement object R is captured by the imaging device 30 in a state where the predetermined stripe pattern is projected from the projection device 20 toward the measurement object R.

In the phase shift method, a sine wave pattern specified by the luminance value I (x, y, n) in the following formula 1 is adopted to obtain a phase value θ corresponding to a distorted value according to a surface shape of the measurement object R based on a grid image (stripe image). The grating image is captured in a state where a predetermined stripe pattern (a pattern in which the luminance changes periodically in a first direction and the luminance does not change in a second direction perpendicular to the first direction) is projected on the measurement object R. When the number of phase shifts is N, the luminance values I (x, y, n) of N phase-shifted grid images (stripe images) are expressed by formula 1.

$$I(x, y, n) = a(x, y)\cos\{\theta(x, y) + 2\pi n/N\} + b(x, y) \qquad \text{(Formula 1)}$$

Here, point (x, y) is a point in the grid image, a (x, y) indicates a luminance amplitude, b (x, y) indicates a background luminance, and θ (x, y) indicates a phase value of the grid of n=0. A distance z to the point (x, y) is measured according to the phase value θ (x, y) calculated from the luminance values I (x, y, n) of N grid images.

In a case where three grid images are obtained in one period of above-described R, G, and B color light emitting states, N=3, and the luminance value I (x, y, 0) in the R color light emitting state, the luminance value I (x, y, 1) in the G color light emitting state, and the luminance value I (x, y, 2) in the B color light emitting state are obtained from the captured image. In this case, the specified stripe pattern for the phase shift method is configured so that a sine wave pattern configured only by R color, a sine wave pattern configured only by G color, and a sine wave pattern configured only by B color are phase-shifted from one another by 2π/3.

In response to obtaining the luminance values I (x, y, 0), I (x, y, 1), and I (x, y, 2) at the point (x, y) in the captured image, the measurement device 40 calculates the phase value θ (x, y) using the above formula 1, and measures the distance z to the point (x, y) according to the phase value θ (x, y) calculated as described above. By measuring the distance z to each point (x, y) of the captured measurement object R, the three-dimensional shape of the measurement object R can be measured.

Figure 3:
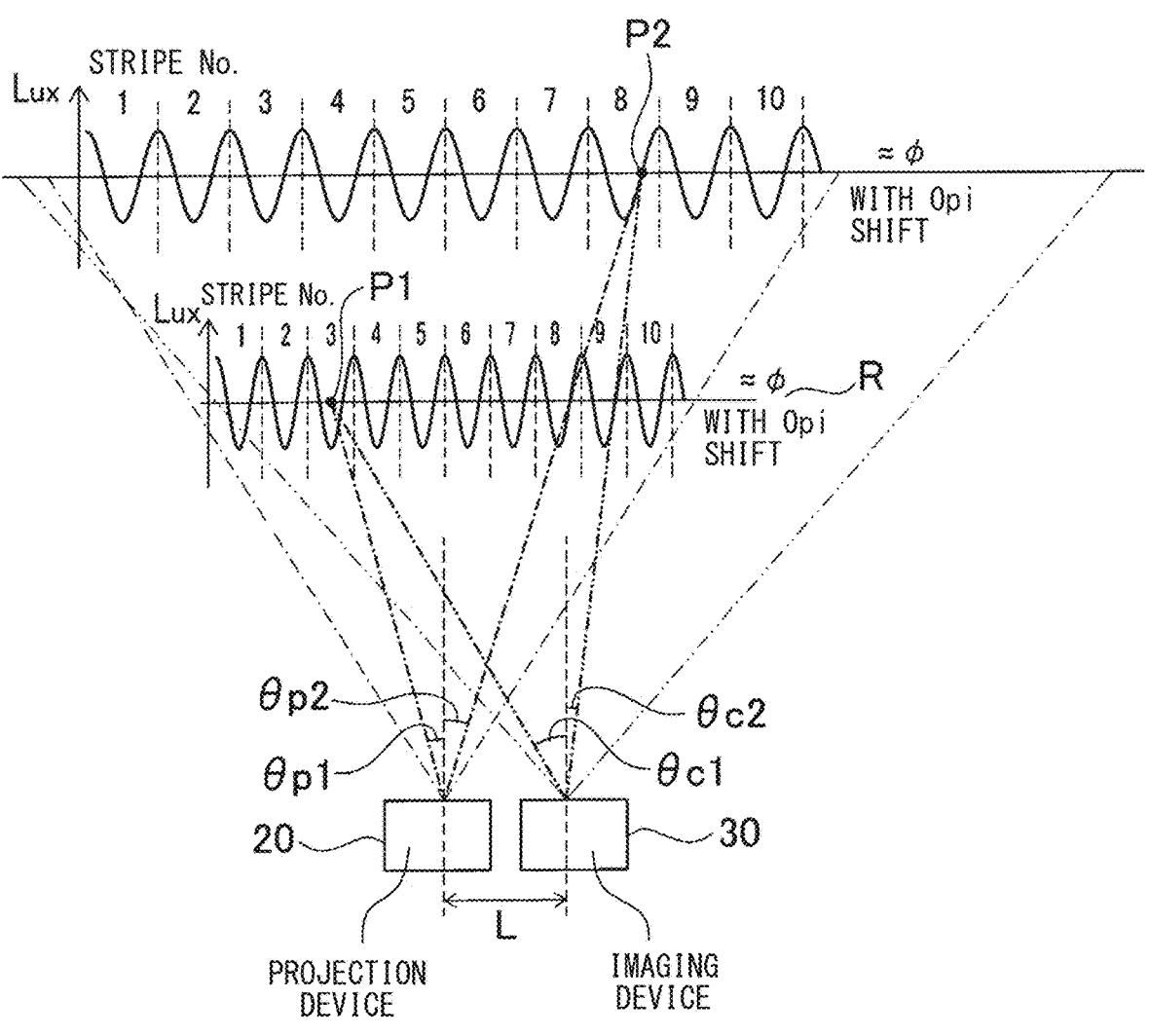
FIG. 3 is a diagram for explaining three-dimensional measurement using the phase shift method.

For example, when determining the distance z to the point P1 shown in FIG. 3, the phase value θ of point P1 and information for identifying what stripe number of the point P1 (stripe number) are determined from N images captured by the imaging device 30. The N images are captured under a state where the predetermined stripe pattern is shifted by N times and then projected by the projection device 20. An angle θp1 of the projection device 20 and an angle θc1 of the imaging device 30 are determined from the phase value θ and the stripe number obtained in the above-described manner. Since the distance (parallax L) between the projection device 20 and the imaging device 30 is known, the distance z to the point P1 can be determined by triangulation. The distance z to point P2 shown in FIG. 3 can be determined by triangulation based on the phase value θ of point P2 obtained from N captured images, the angle θp2 of the projection device 20 and the angle θc2 of the imaging device 30, which are obtained from the stripe number. By performing this calculation over the entire measurement area, three-dimensional measurement can be performed.

The following will describe the three-dimensional measurement process performed by the measurement device 40 when measuring the three-dimensional shape of measurement object R using the phase shift method in detail.

In the present embodiment, the event camera is used as an imaging device for accurately imaging the measurement object R that moves at relatively high speed. In such a configuration, event data corresponding to a pixel having luminance change is output. Since the event data does not include luminance values, the luminance values (I (x, y, 0), I (x, y, 1), I (x, y, 2)) required for the phase shift method cannot be directly obtained.

Since the positive polarity event data is output at a start time point of light emission, and then the negative polarity event data is output at an end time point of light emission, the brightness is increased with an increase in time difference between output time of the positive polarity event data and the output time of the negative polarity event data. Therefore, for each pixel in the captured image, the luminance value can be obtained based on the time difference between the output time of the positive polarity event data and the output time of the negative polarity event data.

Figure 4A:
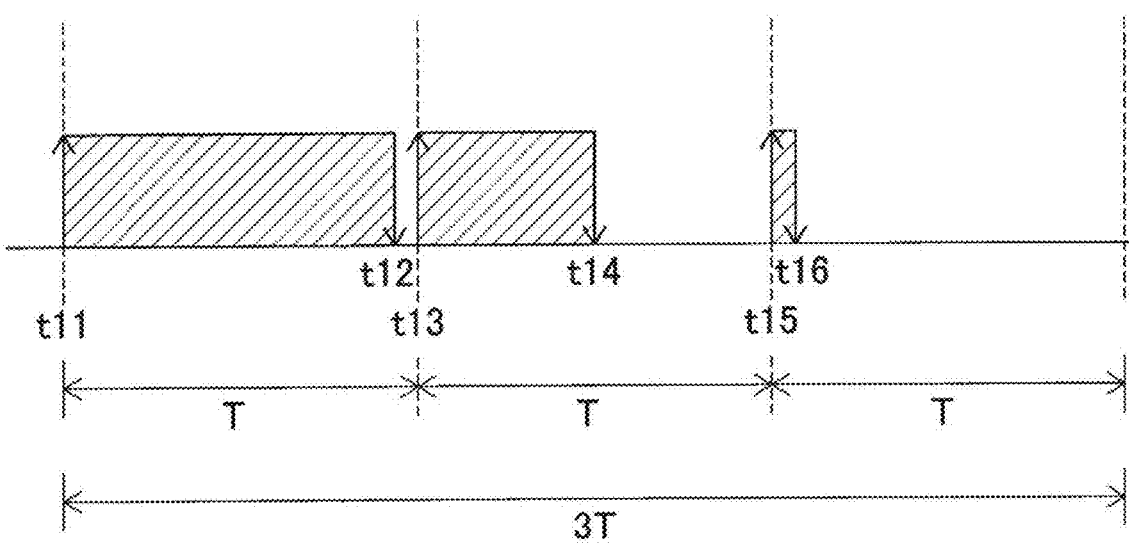
FIG. 4A is an explanatory diagram illustrating an R color light emitting state, a G color light emitting state, and a B color light emitting state at a certain pixel level when a stripe pattern is projected.

For example, as shown in FIG. 4A, assume that at a certain pixel level, an R color light emitting state, a G color light emitting state, and a B color light emitting state are repeated at a predetermined cycle of 3T (unit time period of T). In addition, in FIG. 4A, FIG. 4B, and FIG. 5 to be described later, the output of positive polarity event data is indicated by an upward arrow, and the output of negative polarity event data is indicated by a downward arrow.

In the shown color light emitting state, positive polarity event data is output at the start time point of the R color light emitting state (see t11 in FIG. 4A), and negative polarity event data is output at the end time point of the R color light emitting state (see t12 in FIG. 4A). Then, positive polarity event data is output at the start time point of the G color light emitting state (see t13 in FIG. 4A), and negative polarity event data is output at the end time point of the G color light emitting state (see t14 in FIG. 4A). Then, positive polarity event data is output at the start time point of the B color light emitting state (see t15 in FIG. 4A), and negative polarity event data is output at the end time point of the B color light emitting state (see t16 in FIG. 4A).

Figure 4B:
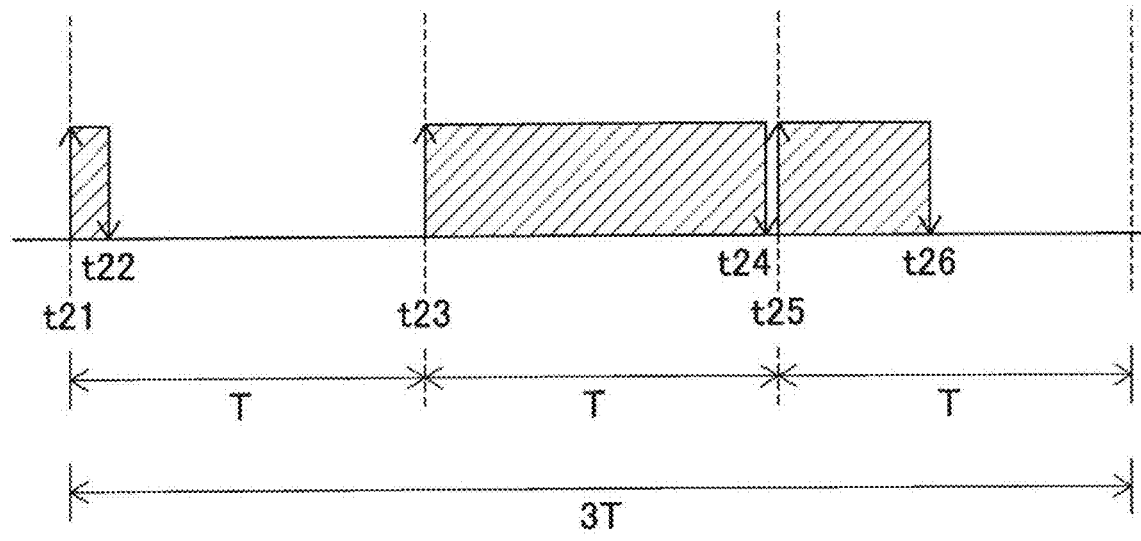
FIG. 4B is an explanatory diagram illustrating an R color light emitting state, a G color light emitting state, and a B color light emitting state at a pixel level different from that in FIG. 4A.

At a pixel level different from the pixel level shown in FIG. 4A, as shown in FIG. 4B, positive polarity event data is output at the start time point of the R color light emitting state (see t21 in FIG. 4B), and negative polarity event data is output at the end time point of the R color light emitting state (see t22 in FIG. 4B). Then, positive polarity event data is output at the start time point of the G color light emitting state (see t23 in FIG. 4B), and negative polarity event data is output at the end time point of the G color light emitting state (see t24 in FIG. 4B). Then, positive polarity event data is output at the start time point of the B color light emitting state (see t25 in FIG. 4B), and negative polarity event data is output at the end time point of the B color light emitting state (see t26 in FIG. 4B).

Since the brightness of R color is increased with an increase of duration from the start time point of R color light emitting state to the end time point of R color light emitting state, the R color luminance value can be obtained according to the duration from the start time point of R color light emitting state to the end time point of R color light emitting state. Similarly, the G color luminance value can be obtained according to the duration from the start time point of G color light emitting state to the end time point of G color light emitting state. Similarly, the B color luminance value can be obtained according to the duration from the start time point of B color light emitting state to the end time point of B color light emitting state.

The luminance value (luminance information) can be obtained based on the time difference between the output time of positive polarity event data and the output time of negative polarity event data in pixel units in the captured image. In the example of FIG. 4A, the luminance value I (x, y, 0) of the R color light emitting state can be calculated by t12–t11, which is the time difference between the output time of positive polarity event data and the output time of negative polarity event data for the R color light emitting state. Similarly, the luminance value I (x, y, 1) of the G color light emitting state can be calculated based on the time difference of t14–t13. The luminance value I (x, y, 2) of the B color light emitting state can be calculated based on the time difference of t16–t15. Using the luminance values obtained in the above-described manner, the three-dimensional shape of measurement object can be measured using the phase shift method. That is, the event data can be used to measure the three-dimensional shape of measurement object.

The following will describe a configuration for increasing a measuring speed of three-dimensional measurement by utilizing the polarity of event data according to the present embodiment.

When a luminance change occurs at each pixel such that the pixel becomes brighter and brightness exceeds a first threshold value (bright side threshold value) TH1, the imaging device 30 outputs the positive polarity event data. When the light disappears and a luminance change occurs at each pixel falls below a second threshold value (dark side threshold value) TH2 and becomes darker, the imaging device 30 outputs the negative polarity event data.

Figure 5:
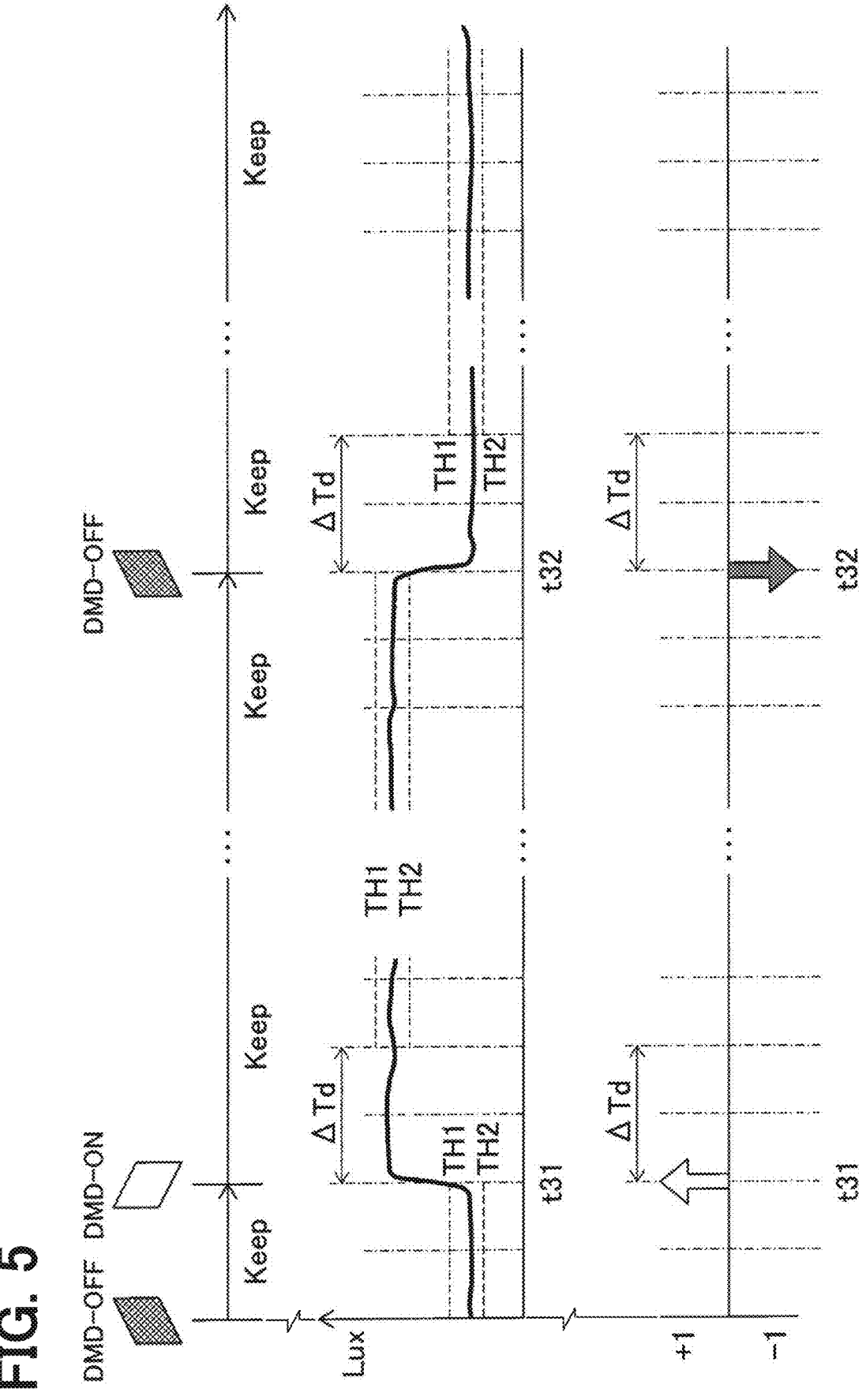
FIG. 5 is an explanatory diagram illustrating an output state of event data whose polarity is not controlled.

In the example shown in FIG. 5, at a certain pixel (xm, yn), when the mirror of the corresponding DMD element of the projection device 20 turns ON at the start point of unit time period T, the amount of light received at time t31 (the voltage generated by the light reception) exceeds the first threshold value TH1. Thus, the event data is output with positive polarity. Then, after elapse of a dead time period ΔTd set to be shorter than the unit time period T, a new first threshold TH1 and a new second threshold TH2 are set. When the mirror of the DMD element turns OFF before the elapse of unit time period T, the amount of light received at time point t32 falls below the second threshold TH2. Thus, the subsequent event data is output with negative polarity. Then, after an elapse of dead time period ΔTd, the first threshold value TH1 and the second threshold value TH2 are newly set. The dead time period ΔTd is set to a predetermined time period that is sufficiently short with respect to the unit time period T. The next event data is not output until the dead time ΔTd has elapsed after the last output of event data.

In this configuration, when previous event data having positive polarity and subsequent event data having negative polarity are output alternately, the polarity of the event data cannot be controlled. Thus, the polarity of the event data cannot be given any meaning.

The present disclosure aims to increase the amount of information acquired when the event data is output by controlling the polarity of event data in addition to the time difference between the output time points of two records of event data, that is, the previous event data and the subsequent event data.

Compared with a configuration in which 8-bit information is expressed using time period of 256 ms by utilizing 1 ms as unit time period as one record of information without controlling the polarity of event data, a configuration in which the polarity of subsequent event data (hereinafter also referred to as end point polarity) is controlled, the information changes depending on whether the end point polarity is positive or negative. Thus, 16 bits of information can be expressed with the same time period of 256 ms. By controlling the end point polarity, the time required to express the same 8-bit information can be reduced by half, thereby enabling an increase of three-dimensional measurement speed.

Figure 6:
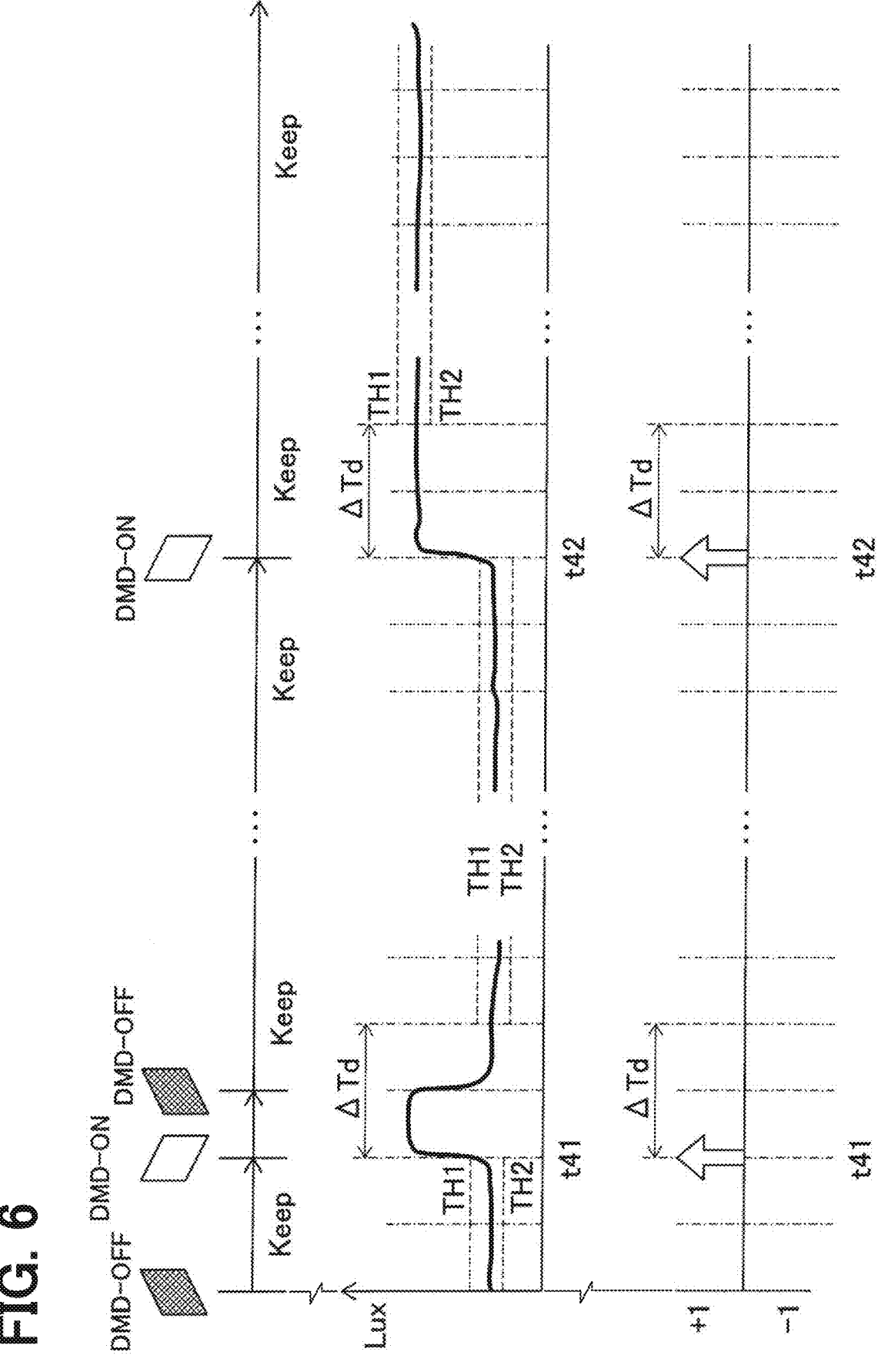
FIG. 6 is an explanatory diagram illustrating an output state of event data whose polarity is controlled by switching mirrors of a DMD element during dead time.

For example, to control the end point polarity to positive polarity, as illustrated in FIG. 6, the mirror of corresponding DMD element of the projection device 20 is turned ON at the start time point of unit time period T, and then the mirror of the DMD element is changed to the OFF state during the dead time period $\Delta Td$. As a result, in the imaging device 30, after the amount of light received at time t41 exceeds the first threshold TH1 and the previous event data is output in positive polarity, the first threshold TH1 and the second threshold TH2 are newly set after the elapse of dead time period $\Delta Td$ corresponding to the DMD-OFF state. Thereafter, when the mirror of DMD element is turned on again and the amount of light received at time t42 exceeds the first threshold value TH1, the subsequent event data is controlled to have the positive polarity and then output.

As described above, by switching the ON/OFF state of each mirror of the DMD element during the dead time period $\Delta Td$ after start of the unit time period T, it is possible to continuously output event data having the same positive polarity. That is, by controlling the end point polarity of the event data in response to the ON/OFF state of each mirror of the DMD element during the dead time period $\Delta Td$, it is possible to increase (double) the amount of information obtained when the event data is output.

As described above, when the stripe pattern for controlling end point polarity (hereinafter also referred to as a polarity control stripe pattern) is projected from the projection device 20 and the grid image is captured by the imaging device 30, the measurement device 40 determines stripe pattern information Is (x, y, n) corresponding to the luminance value I (x, y, n) for N phase-shifted grid images, and then determines, using the following formula 2, the phase value $\theta$ (x, y) using the stripe pattern information Is (x, y, n) determined as described above.

$$Is\,(x,\,y,\,n) = a(x,\,y)\cos\{\theta(x,\,y) + 2\pi n/N\} + b(x,\,y) \qquad \text{(Formula 2)}$$

In the present embodiment, the stripe pattern information Is (x, y, n) is calculated using the following formula 3 based on the time difference $\Delta Ti$ (x, y, n) between the previous event data and the subsequent event data and a value F1 (x, y, n) determined according to the polarity (end point polarity) of the subsequent event data.

$$Is\,(x,\,y,\,n) = \Delta Ti(x,\,y,\,n) + F1(x,\,y,\,n) \qquad \text{(Formula 3)}$$

In the present embodiment, F1 (x, y, n) has the value of unit time period T when the polarity of subsequent event data is positive, and becomes 0 when the polarity of subsequent event data is negative.

Figure 7:
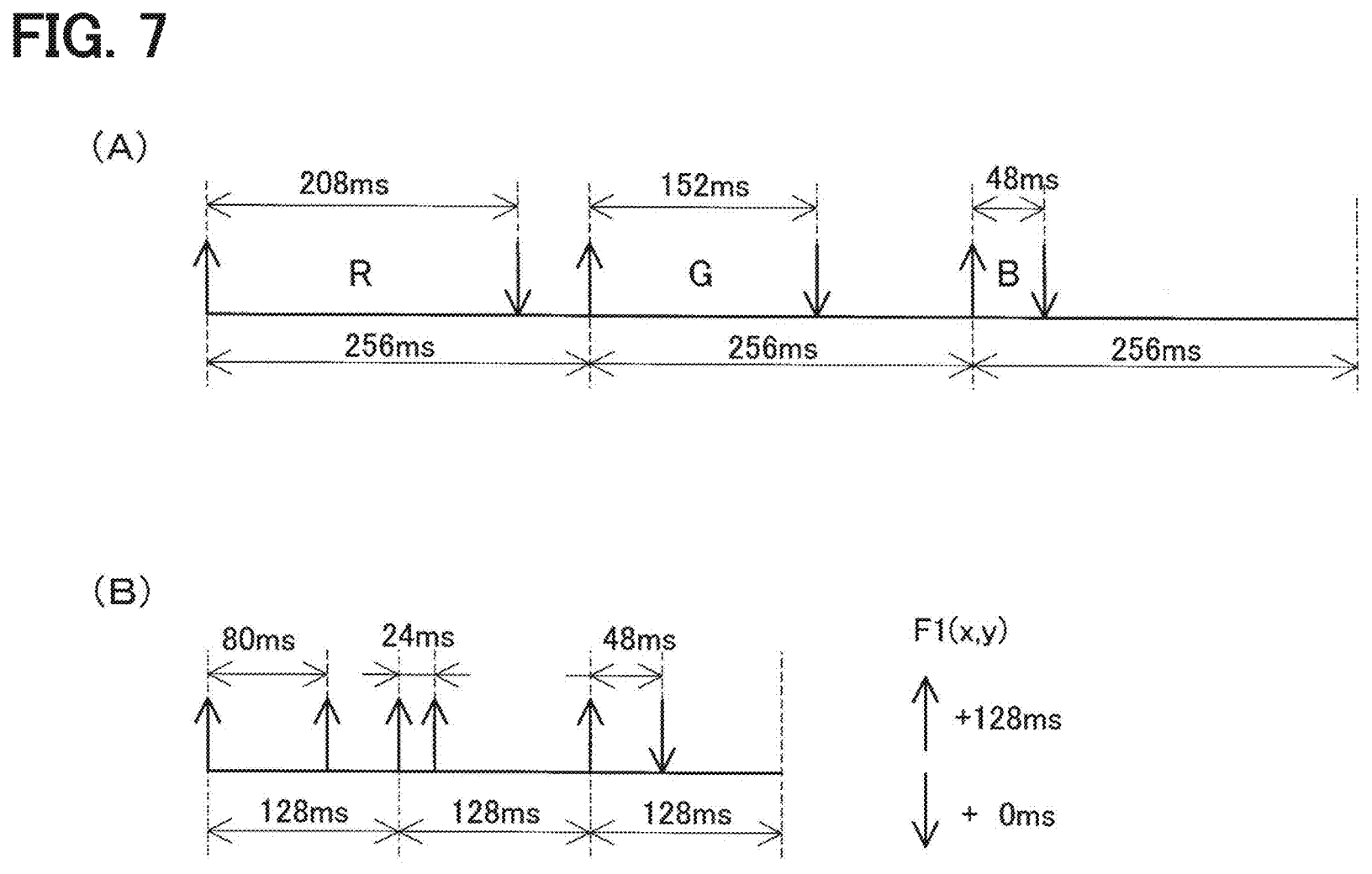

The following will describe a specific example in which the speed of three-dimensional measurement is increased by controlling the end point polarity of event data with reference to FIG. 7.

Suppose that the end point polarity is not controlled, the unit time period T is 256 ms, the output time difference of event data in the R color light emitting state is 208 ms, the output time difference of event data in the G color light emitting state is 152 ms, and the output time difference of event data in the B color light emitting state is 48 ms, as shown in (A) of FIG. 7, the previous event data having positive polarity and the subsequent event data having negative polarity are output in alternative manner. In this case, I (x, y, 0) has a value corresponding to 208 ms, I (x, y, 1) has a value corresponding to 152 ms, and I (x, y, 2) has a value corresponding to 48 ms.

Under a condition that information corresponding to each output time difference shown in (A) of FIG. 7 is obtained, when the end point polarity is controlled to halve the unit time period T to 128 ms, as shown in (B) of FIG. 7, the output time difference of event data in the R color light emitting state is 80 ms and the polarity of subsequent event data is positive, based on the formula 3, Is (x, y, 0) will have a value corresponding to 208 ms (80 ms+128 ms), which is the same as the value I (x, y, 0) when the end point polarity is not controlled. Similarly, when the output time difference of event data in the G color light emitting state is 24 ms and the polarity of subsequent event data is positive, based on the formula 3, Is (x, y, 1) will have a value corresponding to 152 ms (24 ms+128 ms), which is the same as the value I (x, y, 1) when the end point polarity is not controlled. Similarly, when the output time difference of event data in the B color light emitting state is 48 ms and the polarity of subsequent event data is negative, based on the formula 3, Is (x, y, 2) will have a value corresponding to 48 ms (48 ms+0 ms), which is the same as the value I (x, y, 2) when the end point polarity is not controlled. In this way, even though the unit time period T is halved, by controlling the end point polarity of event data, it is possible to obtain the same amount of information, thereby increasing the speed of three-dimensional measurement.

For this reason, the polarity control stripe pattern projected from the projection device 20 needs to be generated so that Is (x, y, n) can be calculated using the formula 3. The controller 11 controls the projection device 20 such that the projection device 20 can project the polarity control stripe pattern generated as described above, and instructs the measurement device 40 at a predetermined timing about information relating to the polarity control stripe pattern projected in the above-described manner. Upon receiving the instruction, the measurement device 40 determines the stripe pattern information Is (x, y, n) of the N phase-shifted grid images captured by the imaging device 30 as described above, and then determines the phase value $\theta$ (x, y) from the stripe pattern information Is (x, y, n) using the above formula 2, thereby measuring the three-dimensional shape of measurement object R.

As described above, in the three-dimensional measurement apparatus 10 according to the present embodiment, the projection device 20 projects the predetermined stripe pattern toward the measurement object R by controlling, using the controller 11, ON/OFF of the reflection of incident light on the DMD for each mirror. The DMD includes multiple mirrors arranged in an array, for each mirror by the controller 11. The controller 11 sets the ON/OFF timing of reflection within a unit time period T for each mirror in accordance with the predetermined stripe pattern. The imaging device 30 includes the imaging element, and the imaging element outputs event data including two-dimensional point data. The two-dimensional point data identifies a position of a pixel that has luminance change upon receiving of light. The imaging element is configured to output positive polarity event data when the luminance change increases the brightness. The image element is configured to output negative polarity event data when the luminance change decreases the brightness. After output of the event data, until elapse of a predetermined period set to be shorter than the unit time period, the next event data is not output. When the measurement device 40 measures the three-dimensional shape of measurement object R with the phase shift method using the stripe pattern information obtained from the image captured by the imaging device 30, the measurement device 40 obtains the stripe pattern information on a pixel-by-pixel basis in the captured image based on the time difference between output time point of previous event data and the output time point of subsequent event data, which are output from the imaging element during the above-described unit time period T, and the polarity (end point polarity) of the subsequent event data.

As described above, since the polarity (end point polarity) of subsequent event data can be controlled, the amount of information obtained when event data is output can be increased compared to a case where the polarity is not controlled. Since the amount of information obtained per unit time period increases, the unit time period can be shortened even when expressing the same amount of information. Thus, the event data can be used to measure the three-dimensional shape of measurement object R, and the three-dimensional measurement speed of measurement object R can be increased using the event data.

As a modified example of the present embodiment, the amount of information obtained when the event data is output may be increased not only by controlling the polarity (end point polarity) of subsequent event data, but also by controlling the polarity of previous event data (hereinafter also referred to as start point polarity). In this configuration, the amount of information obtained in the same unit time period can be increased (doubled). Thus, the unit time period can be shortened even when expressing the same amount of information, thereby enabling increase of three-dimensional measurement speed of measurement object R using event data.

Second Embodiment

The following will describe a three-dimensional measurement apparatus according to a second embodiment with reference to the drawings.

The second embodiment differs from the first embodiment mainly in that the polarity of previous event data (start point polarity) is controlled in addition to the polarity of subsequent event data (end point polarity) to further speed up the three-dimensional measurement. In the present embodiment, components that are substantially the same as those in the first embodiment will be denoted by the same reference symbols, and a description thereof will be omitted.

In the present embodiment, by controlling the time difference between the output time points of two records of event data (previous event data and subsequent event data) as well as the polarity of each event data, the amount of information obtained when event data is output can be further increased, thereby further speeding up the three-dimensional measurement.

In the present embodiment, when the polarity of subsequent event data to be output and the polarity of previous event data to be output are controlled to be the same polarity, in order to output the subsequent event data, the state of mirror of the DMD element of the projection device 20 is further switched during the dead time period ΔTd in which the mirror is switched to the ON state or the OFF state. With this configuration, when the polarity of subsequent event data is positive, the polarity of the previous event data, which is output after the last subsequent data, can also be controlled to be positive. That is, the polarity of the subsequent event data (end point polarity) and the polarity of the next previous event data (start point polarity) can be controlled separately from one another.

In the present embodiment, the stripe pattern information Is (x, y, n) is calculated using the following formula 4 based on the time difference ΔTi (x, y, n) between the output time of previous event data and the output time of subsequent event data and a value F2 (x, y, n) that is determined according to the start point polarity and the end point polarity.

$$Is\,(x,\,y,\,n) = \Delta Ti(x,\,y,\,n) + F2(x,\,y,\,n) \qquad \text{(Formula 4)}$$

In the present embodiment, F2 (x, y, n) has a value of three times of the unit time period T when the start point polarity is positive and the end point polarity is negative. The F2 (x, y, n) has a value of twice of the unit time period T when the start point polarity is positive and the end point polarity is positive. The F2 (x, y, n) has a value of the unit time period T when the start point polarity is negative and the end point polarity is positive. The F2 (x, y, n) has a value of 0 when the start point polarity is negative and the end point polarity is negative.

Figure 8:
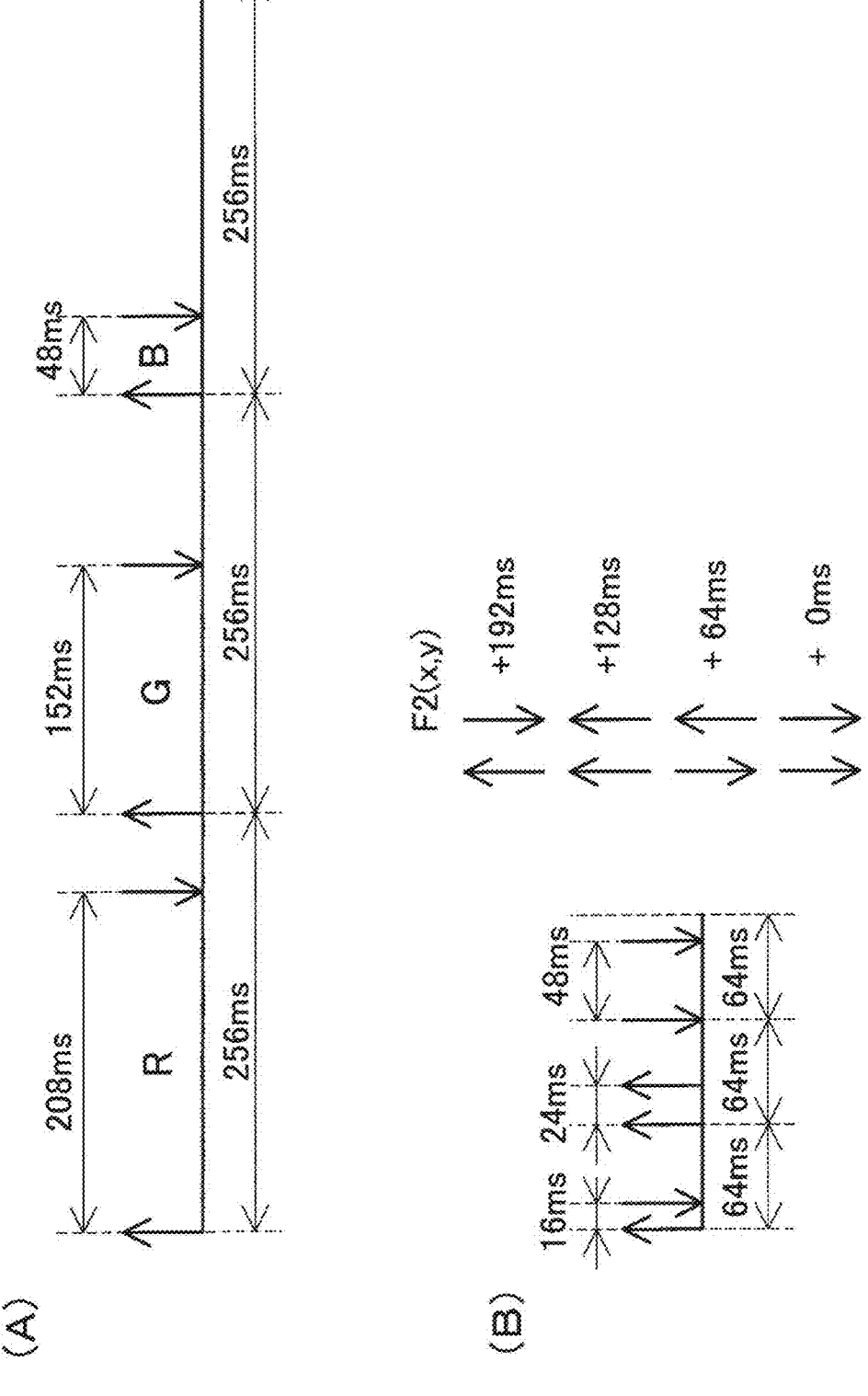
FIG. 8 shows, in (A), an explanatory diagram illustrating an output state of event data for each of the R, G, and B color light emitting states in a case where polarity control is not performed in a second embodiment, and shows, in (B), an explanatory diagram illustrating an output state of event data for each of the R, G, and B color light emitting states in a case where control of start point polarity and end point polarity is performed in the second embodiment.

The following will describe a specific example in which the speed of three-dimensional measurement is increased by controlling the start point polarity and the end point polarity of event data with reference to FIG. 8.

Similar to (A) of FIG. 7, in the example shown in (A) of FIG. 8, suppose that the start point polarity and the end point polarity are not controlled, the unit time period T is 256 ms, the output time difference of event data in the R color light emitting state is 208 ms, the output time difference of event data in the G color light emitting state is 152 ms, and the output time difference of event data in the B color light emitting state is 48 ms, the previous event data having positive polarity and the subsequent event data having negative polarity are output in alternative manner.

Under a condition that information corresponding to each output time difference shown in (A) of FIG. 8 is obtained, when the start point polarity and the end point polarity are controlled to ¼ of the unit time period T to 64 ms, as shown in (B) of FIG. 8, the output time difference of event data in the R color light emitting state is 16 ms, the start point polarity is positive, and the end point polarity is negative, based on the formula 4, Is (x, y, 0) will have a value corresponding to 208 ms (16 ms+192 ms), which is the same as the value I (x, y, 0) when the start point polarity and the end point polarity are not controlled. Similarly, when the output time difference of event data in the G color light emitting state is 24 ms and the start point polarity is positive and the end point polarity is positive, based on the formula 4, Is (x, y, 1) will have a value corresponding to 152 ms (24 ms+128 ms), which is the same as the value I (x, y, 1) when the start point polarity and the end point polarity are not controlled. Similarly, when the output time difference of event data in the B color light emitting state is 48 ms and the start point polarity is negative and the end point polarity is positive, based on the formula 4, Is (x, y, 2) will have a value corresponding to 48 ms (48 ms+0 ms), which is the same as the value I (x, y, 2) when the start point polarity and the end point polarity are not controlled. In this way, even though the unit time period T is set to ¼, by separately controlling the start point polarity and the end point polarity of event data, it is possible to obtain the same amount of information, thereby further increasing the speed of three-dimensional measurement.

For this reason, the polarity control stripe pattern projected from the projection device 20 needs to be generated so that Is (x, y, n) can be calculated using the formula 4. The controller 11 controls the projection device 20 such that the projection device 20 can project the polarity control stripe pattern generated as described above, and instructs the measurement device 40 at a predetermined timing about information relating to the polarity control stripe pattern projected in the above-described manner. Upon receiving the instruction, the measurement device 40 determines the stripe pattern information Is (x, y, n) of the N phase-shifted grid images captured by the imaging device 30 as described above, and then determines the phase value θ (x, y) from the stripe pattern information Is (x, y, n) using the above formula 2, thereby measuring the three-dimensional shape of measurement object R.

As described above, in the three-dimensional measurement apparatus 10 according to the present embodiment, the measurement device 40 calculates the above-mentioned stripe pattern information on a pixel-by-pixel basis in the captured image based on the time difference between the output time points of the previous event data and the subsequent event data output from the imaging element within a unit time period and the polarity of previous event data (start point polarity) and the polarity of subsequent event data (end point polarity).

Compared with the first embodiment in which only the end point polarity (or start point polarity) is controlled, the configuration of the present embodiment can further increase the amount of information obtained when the event data is output, thereby enabling a further increase of the three-dimensional measurement speed of measurement object using the event data.

The present disclosure is not limited to the above-described embodiments, and may be implemented in different manner.

(1) In the above-described first embodiment, the stripe pattern information Is (x, y, n) is calculated using the above-described formula 3 based on the value F1 (x, y, n) determined according to the polarity (end point polarity) of the subsequent event data and the time difference ΔTi (x, y, n) between the previous event data and the subsequent event data. The calculation of stripe pattern information is not limited to this configuration, and may be calculated based on another value determined according to the end point polarity and the time difference ΔTi (x, y, n). As another value, when the polarity of subsequent event data is positive, F1 (x, y, n) may be designed as a constant value of +0.5 or a constant value of −0.5. This depends on how the designer links the combination of time difference ΔTi (x, y, n) and the end point polarity, with the stripe pattern information Is (x, y, n).

In the modified example of the first embodiment described above, the stripe pattern information Is (x, y, n) may be calculated based on the time difference ΔTi (x, y, n) and another value determined according to the polarity (start point polarity) of the previous event data.

(2) In the second embodiment described above, the stripe pattern information Is (x, y, n) is calculated using the above-described formula 4 based on the value F2 (x, y, n) determined according to the polarity (start point polarity) of previous event data, the polarity (end point polarity) of subsequent event data, and the time difference ΔTi (x, y, n) between the previous event data and the subsequent event data. The calculation of stripe pattern information is not limited to this configuration, and may be calculated based on another value determined according to the start point polarity, the end point polarity, and the time difference ΔTi (x, y, n). As another value, the value of F2 (x, y, n) may be set to 0.75 when the start point polarity is positive and the end point polarity is negative, 0.5. The value of F2 (x, y, n) may be set to 0.5 when the start point polarity is positive and the end point polarity is positive. The value of F2 (x, y, n) may be set to 0.25 when the start point polarity is negative and the end point polarity is positive. The value of F2 (x, y, n) may be set to 0 when the start point polarity is negative and the end point polarity is negative. The value of F2 (x, y, n) depends on how the designer links the combination of time difference ΔTi (x, y, n), the start point polarity, and the end point polarity, with the stripe pattern information Is (x, y, n).

(3) In the foregoing embodiments, the three-dimensional measurement apparatus 10 is attached to the robot hand and moves in the attached state to measure the three-dimensional shape of measurement object that moves relative to the robot hand. The configuration of three-dimensional measurement apparatus 10 is not limited to this configuration, and may be used in a fixed state to measure the three-dimensional shape of measurement object that moves on a conveyor line.

(4) The three-dimensional measurement apparatus 10 may be configured such that the projection device 20, the imaging device 30 and the measurement device 40 are provided by separate devices. For example, the measurement device 40 is configured as an information processing terminal capable of performing wireless or wired communication with the projection device 20 and the imaging device 30.

(5) The predetermined stripe pattern projected by shifting N times by the projection device 20 is not limited to being composed of R, G, and B color light emitting states under the condition of N=3. The predetermined stripe pattern may be composed of light and dark portions that periodically change.

The examples of embodiments, configurations, and aspects of the three-dimensional measurement apparatus and three-dimensional measurement method according to the present disclosure is described. The embodiments, configurations, and aspects of the present disclosure are not limited to the above-described embodiments, configurations. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. A three-dimensional measurement apparatus comprising:

a projection device projecting a predetermined stripe pattern on a measurement object;

an imaging device capturing an image of the measurement object on which the predetermined stripe pattern is projected;

a measurement device measuring a three-dimensional shape of the measurement object using a phase shift method by determining stripe pattern information from the image captured by the imaging device; and a controller controlling the projection device, wherein the projection device projects the predetermined stripe pattern by controlling, using the controller, ON or OFF of reflection of incident light by a digital micromirror device, which has multiple mirrors arranged in an array, for each of the multiple mirrors, the controller sets an ON time or an OFF time of the reflection of incident light within a unit time period for each of the multiple mirrors in accordance with the predetermined stripe pattern, the imaging device includes an imaging element, the imaging element outputs event data including two-dimensional point data, the two-dimensional point data identifies a position of a pixel that has luminance change upon receiving of light, the imaging device generates the image of the measurement object based on the event data output from the imaging element, the imaging device:

outputs positive event data when a luminance of the pixel becomes bright;

outputs negative event data when the luminance of the pixel becomes dark; and suspends output of next event data until elapse of a predetermined time period, which is set to be shorter than the unit time period, after output of the event data, and the measurement device determines, in the image captured by the imaging device, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

2. The three-dimensional measurement apparatus according to claim 1, wherein the measurement device determines, in the image captured by the imaging device, the stripe pattern information on the pixel-by-pixel basis based on (i) the time difference between the output time of the previous event data and the output time of the subsequent event data, which are output from the imaging element during the unit time period, and (ii) the polarity of the previous event data and the polarity of the subsequent event data.

3. A three-dimensional measurement method comprising:

projecting, using a projection device, a predetermined stripe pattern on a measurement object;

capturing, using an imaging device, an image of the measurement object on which the predetermined stripe pattern is projected;

measuring, using a measurement device, a three-dimensional shape of the measurement object using a phase shift method by determining stripe pattern information from the image captured by the imaging device;

controlling, using a controller, the projection device to project the predetermined stripe pattern by controlling ON or OFF of reflection of incident light by a digital micromirror device, which has multiple mirrors arranged in an array, for each of the multiple mirrors; and setting, using the controller, an ON time or an OFF time of the reflection of incident light within a unit time period for each of the multiple mirrors in accordance with the predetermined stripe pattern, wherein the imaging device includes an imaging element, the imaging element outputs event data including two-dimensional point data, the two-dimensional point data identifies a position of a pixel that has luminance change upon receiving of light, the method further comprises:

generating, using the imaging device, the image of the measurement object based on the event data output from the imaging element;

outputting positive event data when a luminance of the pixel becomes bright;

outputting negative event data when the luminance of the pixel becomes dark;

suspending output of next event data until elapse of a predetermined time period, which is set to be shorter than the unit time period, after output of the event data; and determining, using the measurement device, in the image captured by the imaging device, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

4. The three-dimensional measurement method according to claim 3, further comprising:

determining, using the measurement device, in the image captured by the imaging device, the stripe pattern information on the pixel-by-pixel basis based on (i) the time difference between the output time of the previous event data and the output time of the subsequent event data, which are output from the imaging element during the unit time period, and (ii) the polarity of the previous event data and the polarity of the subsequent event data.

5. A three-dimensional measurement apparatus comprising:

a projector projecting a predetermined stripe pattern on a measurement object;

a camera capturing an image of the measurement object on which the predetermined stripe pattern is projected;

a calculator measuring a three-dimensional shape of the measurement object using a phase shift method by calculating stripe pattern information from the image captured by the camera; and a controller controlling the projector, wherein the projector projects the predetermined stripe pattern by controlling, using the controller, ON or OFF of reflection of incident light by a digital micromirror device, which has multiple mirrors arranged in an array, for each of the multiple mirrors, the controller sets an ON time or an OFF time of the reflection of incident light within a unit time period for each of the multiple mirrors in accordance with the predetermined stripe pattern, the camera includes an imaging element, the imaging element outputs event data including two-dimensional point data, the two-dimensional point data identifies a position of a pixel that has luminance change upon receiving of light, the camera generates the image of the measurement object based on the event data output from the imaging element, the camera:

outputs positive event data when a luminance of the pixel becomes bright;

outputs negative event data when the luminance of the pixel becomes dark; and suspends output of next event data until elapse of a predetermined time period, which is set to be shorter than the unit time period, after output of the event data, and the calculator calculates, in the image captured by the camera, the stripe pattern information on a pixel-by-pixel basis based on (i) a time difference between an output time of previous event data and an output time of subsequent event data, which are output from the imaging element during the unit time period, and (ii) at least one of a polarity of the previous event data or a polarity of the subsequent event data.

6. The three-dimensional measurement apparatus according to claim 5, wherein the calculator calculates, in the image captured by the camera, the stripe pattern information on the pixel-by-pixel basis based on (i) the time difference between the output time of the previous event data and the output time of the subsequent event data, which are output from the imaging element during the unit time period, and (ii) the polarity of the previous event data and the polarity of the subsequent event data.

* * * * *